US010534325B2

(12) United States Patent
Dash et al.

(10) Patent No.: US 10,534,325 B2
(45) Date of Patent: Jan. 14, 2020

(54) ADAPTIVE CONTROL TECHNIQUES FOR PH CONTROL OR CONTROL OF OTHER INDUSTRIAL PROCESSES

(71) Applicant: Honeywell International Inc., Morris Plains, NJ (US)

(72) Inventors: Sachindra K. Dash, Scottsdale, AZ (US); Konstantinos Tsakalis, Chandler, AZ (US); J. Ward MacArthur, Scottsdale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 542 days.

(21) Appl. No.: 15/210,421

(22) Filed: Jul. 14, 2016

(65) Prior Publication Data

US 2018/0017948 A1    Jan. 18, 2018

(51) Int. Cl.
G05B 13/02       (2006.01)
C02F 1/66        (2006.01)
G05B 13/04       (2006.01)

(52) U.S. Cl.
CPC .............. G05B 13/024 (2013.01); C02F 1/66 (2013.01); G05B 13/042 (2013.01); C02F 2209/06 (2013.01)

(58) Field of Classification Search
CPC .... G05B 13/024; G05B 13/04; G05B 13/042; C02F 1/66; C02F 2209/06; G05D 21/02

(Continued)

(56) References Cited

U.S. PATENT DOCUMENTS 5,610,843 A    3/1997  Chou
5,718,138 A *  2/1998  Imanari ................... B21B 37/50
                                                      700/152

(Continued)

FOREIGN PATENT DOCUMENTS

JP    2013012249 A     1/2013
NL       2010258   * 12/2012  ............. G05B 13/04

OTHER PUBLICATIONS

Convergence Analysis of a Frequency-Domain Adaptive Filter with Exponential Power Averaging and Generalized Window Function, Piet C. W. Sommen, Piet J. Van Gerwen, Henk J. Kotmans, and A. J. E. M. Janssen, IEEE Transactions on Circuits and Systems, vol. CAS-34, No. 7, Jul. 1987 (Year: 1987).*

(Continued)

*Primary Examiner* — Kenneth M Lo
*Assistant Examiner* — Michael W Choi

(57) ABSTRACT

This disclosure provides adaptive control techniques for pH control or control of other industrial processes. For example, in one method, a robust stability condition (RSC) value is determined during operation of a process controller, and a characteristic of the process controller is adaptively modified based on the RSC value. The RSC value provides an estimate of performance of the process controller in controlling the industrial process. In another method, one of multiple process controllers is selected based on RSC values associated with the process controllers, and one or more control signals are output from the selected process controller to an industrial process in order to control the industrial process. The RSC values provide estimates of performances of the multiple process controllers in controlling the industrial process.

23 Claims, 6 Drawing Sheets

(58) Field of Classification Search
USPC .......................................................... 700/37
See application file for complete search history.

(56) References Cited

U.S. PATENT DOCUMENTS

| | | | |
|---|---|---|---|
| 6,026,332 A | 2/2000 | Kenknight et al. | |
| 6,253,113 B1* | 6/2001 | Lu ........................... | G05B 5/01 |
| | | | 700/28 |
| 8,224,476 B2 | 7/2012 | Chu et al. | |
| 8,311,653 B2 | 11/2012 | Zhan et al. | |
| 2002/0040250 A1* | 4/2002 | Gaikwad ................ | G05B 11/42 |
| | | | 700/37 |
| 2003/0129946 A1* | 7/2003 | Giry-Cassan .......... | H03G 3/001 |
| | | | 455/67.11 |
| 2003/0195650 A1* | 10/2003 | Danielson ............ | G05D 7/0611 |
| | | | 700/213 |
| 2006/0119783 A1 | 6/2006 | Fukuoka et al. | |
| 2007/0142932 A1* | 6/2007 | Stewart .................... | G05B 5/01 |
| | | | 700/20 |
| 2008/0125875 A1* | 5/2008 | Stewart ................ | G05B 13/024 |
| | | | 700/20 |
| 2008/0183311 A1 | 7/2008 | MacArthur et al. | |
| 2009/0018671 A1 | 1/2009 | Srinivasan et al. | |
| 2009/0198350 A1* | 8/2009 | Thiele ................... | G05B 13/042 |
| | | | 700/30 |
| 2009/0265021 A1 | 10/2009 | Dubay et al. | |
| 2011/0074330 A1* | 3/2011 | Ellis ..................... | G05B 13/042 |
| | | | 318/561 |
| 2012/0323367 A1 | 12/2012 | MacArthur et al. | |
| 2013/0262019 A1 | 10/2013 | Chu et al. | |
| 2016/0026171 A1 | 1/2016 | Dash et al. | |

OTHER PUBLICATIONS

Bo Wahlberg; "System Identification Using Kautz Models" IEEE Transactions on Automatic Control, vol. 39, No. 6; Jun. 1994; pp. 1276-1282.
Juan Carlos Gomez; "Analysis of Dynamic System Identification using Rational Orthonormal Bases" Dept of Electrical and Computer Engineering, The University of Newcastle New South Wales, Australia, Feb. 1998; 209 pages.
Ninness, et al; "A Unifying Construction of Orthonormal Bases for System Identification"; Proceedings of the 33rd Conference on Decision and Control; Lake Buena Vista, FL; Dec. 1994; pp. 3388-3393.
Qin, et al; "A survey of industrial model predictive control technology"; Control Engineering Practice 11; 2003; pp. 733-764.
Patwardhan, et al.; "From data to diagnosis and control using generalized orthonormal basis filters. Part I: Model predictive and fault tolerant control" Dept of Chemical Engineering, Indian Institute of Technology, Bombay, Powai, Mumbai India; Oct. 2005, pp. 819-835.
Patwardhan, et al.; "From data to diagnosis and control using generalized orthonormal basis filters. Part II: Development of state observers" Dept of Chemical Engineering, Indian Institute of Technology, Bombay, Powai, Mumbai India; Feb. 2006, pp. 157-175.
Lind, et al; "Regressor and Structure Selection in NARX Models Using a Structured ANOVA Approach"; Division of Automatic Control, Dept of Electrical Engineering, Linkoping, Sweden; Jun. 12, 2007; 13 pages.
Jacobsen, et al.; "Multiple Steady States in Ideal Two-Product Distillation" Chemical Engineering Norwegian Institute of Technology (NTH); Norway; Nov. 1990; 33 pages.
Abonyi, et al.; "Identification and control of Nonliner Systems Using Fuzzy Hammerstein Models" Industrial & Engineering Chemistry Research; 2000; pp. 4302-4314.
Dempsey, et al.; "Identification of Hammerstein Models with Cubic Spline Nonlinearities"; IEEE Transaction on Biomedical Engineering; vol. 51, No. 2.; Feb. 2004; pp. 237-245.

Heuberger, et al.; "A Generalized Orthonormal Basis for Linear Dynamical Systems" IEEE Transactions on Automatic Control; vol. 40, No. 3; Mar. 1995; pp. 451-465.
Toth, et al.; "Identification of nonlinear process models in an LPV framework"; Proc. of the 9th International Symp. on Dynamics and Control; Jul. 5-7, 2010; pp. 869-874.
Toth, et al.; "An LPV identification Framework Based on Orthonormal Basis Functions"; Proc. of the 15th IFAC Symposium Identification; Jul. 6-8, 2009; pp. 1328-1333.
Vodencarevic, et al.; "Identifying Behavior Models for Process Plants"; IEEE ETFA; 2011; 8 pages.
Juan C. Gomez; "Identification of Nonlinear Systems using Orthonormal Bases"; Proc. IASTED International Conference on Intelligent Systems and Control; 2001; 18 pages.
International Search Report dated Oct. 19, 2015 in connection with International Patent Application No. PCT/ US2015/040106; 5 pages.
International Written Opinion dated Oct. 19, 2015 in connection with International Patent Application No. PCT/ US2015/040106; 6 pages.
Lennart Ljung; "System identification theory for the user"; Automatica 38; 2002; pp. 375-378.
Zhan, et al.; "System Identification for Robust Control"; IEEE; Proceedings of the 2007 American Control Conference; 2007; pp. 846-851.
Grassi, et al.; "Integrated System identification and PID Controller Tuning by Frequency Loop-Shaping"; IEEE Transaction on Control Systems Tech, vol. 9, No. 2. Mar. 2001; 1 pg.
J. Ward MacArthur; "A new approach for nonlinear process identification using orthonormal bases and ordinal splines"; Journal of Process Control 22; 2012; pp. 375-389.
Doyle, et al.; "Feedback Control Theory"; Macmillan Publishing Co., 1990; 219 pages.
Joshi, et al.; "Robust PID Control in Chemical Process Industries"; repository.asu.edu/attachments/144322/content/Joshi_Tsakalis_CEP.pdf: Nov. 1, 2014; 29 pages.
Van den Hof, et al.; "Identification of normalized coprime plant factors for iterative model and cqntroller enhancement"; Dec. 1993; 6 pages.
Paul Van den Hof; "Closed-Loop Issues in System Identification"; Annual Reviews in Control 22 (1998) 173-186; 1998; 14 pages.
D. McFarlane, et al.; "Robust Stabilization of a Flexible Space Platform : An H Coprime Factor Approach"; Downloaded on Apr. 12, 2010; 6 pages.
Duncan McFarlane, et al.; "Reduced-Order Controller Design Using Coprime Factor Model Reduction"; 1990, 5 pages.
D.C. McFarlane, et al.; "Robust Controller Design Using Normalized Coprime Factor Plant Descriptions"; Lecture Notes in Control and Information Sciences, 2008, 3 pages.
Hernan Alvarez, et al., "pH Neutralization Process as a Benchmark for Testing Nonlinear Controllers," Ind. Eng. Chem. Res. vol. 40, 2001, pp. 2467-2473, publisher American Chemical Society, Washington, DC.
Rakesh Joshi, et al., "Account for Uncertainty with Robust Control Design," Part 1, Chemical Engineering Process (CEP), Nov. 2014, pp. 31-38, publisher American Institute of Chemical Engineers (AIChE).
Rakesh Joshi, et al., "Account for Uncertainty with Robust Control Design," Part 2, Chemical Engineering Process (CEP), Dec. 2014, pp. 46-50, publisher American Institute of Chemical Engineers (AIChE).
J.C. Gomez, et al., "Wiener model identification and predictive control of a pH neutralisation process," IEE Proceedings—Control Theory Applications vol. 151, No. 3, May 2004, pp. 329-338, publisher IEEE, Piscataway, NJ.
Bhaskar D. Kulkarni, et al., "Nonlinear pH Control," Chemtcal Engineering Science, vol. 46, No. 4, 1991, pp. 995-1003, publisher Pergamon Press, Great Britain, available at URL http://www.sciencedirect.com/science/article/pii/000925099185092C.
Al-Duwaish H., et al., "Nonlinear Model Predictive Control of Hammerstein and Wiener Models Using Genetic Algorithms, in: Control Applications," Proceedings of the 2001 IEEE International Conference on Control Applications, Sep. 5-7, 2001 Mexico City, Mexico, 2001, pp. 465-469, publisher IEEE, Piscataway, NJ.

(56) References Cited

OTHER PUBLICATIONS

Omar Galan, et al., "Real-time implementation of multi-linear model-based control strategiesan application to a bench-scale pH neutralization reactor," Journal of Process Control 14, No. 5, 2004, pp. 571-579, available at URL http://www.sciencedirect.com/science/article/pii/S0959152403001070.

Michael A. Henson, et al., "Adaptive Nonlinear Control of a pH Neutralization Process," IEEE Transactions on Control Systems Technology, vol. 2, No. 3, Aug. 1994, pp. 169-182, publisher IEEE, Piscataway, NJ.

Shankar Sastry, et al., "Adaptive Control—Stability, Convergence, and Robustness," 1989, 1-16, 99-157 pages, publisher Prentice Hall, Englewood Cliffs, New Jersey, available at URL https://books.google.com/books?id=-cOviBa9pR8.

Petros A. Ioannou, et al., "Robust Adaptive Control," Jun. 18, 2003, pp. 1-25, available at URL https://books.google.com/books?id=TIYqAQAAMA.

Margareta Stefanovic, et al., "Safe adaptive switching control: Stability and convergence," IEEE Transactions on Automatic Control vol. 53 No. 9, Oct. 2008, pp. 2012-2021, publisher IEEE, Piscataway, NJ.

B.D.O. Anderson, et al., "Multiple model adaptive control with safe switching," International Journal of Adaptive Control and Signal Processing 15:445}470 (DOI: 10.1002/acs.684), 2001, pp. 445-470, publisher John Wiley & Sons, Ltd, Hoboken, New Jersey, available at URL http://dx.doi.org/10.1002/acs.684.

S. Gnoth, et al., "Simple adaptive pH control in bioreactors using gain-scheduling methods," Applied Microbiology and Biotechnology 85:955-964, DOI 10.1007/s00253-009-2114-5, 2009, pp. 955-964, publisher Springer-Verlag, Berlin, Germany.

Ehsan Peymani, et al., "An Experimental Comparison of Adaptive Controllers on a pH Neutralization Pilot Plant," India Conference, 2008, INDICON 2008, Annual IEEE, vol. 2, 2008, pp. 377-382, publisher IEEE, Piscataway, NJ.

Jari M. Boling, et al., "Multi-model adaptive control of a simulated pH neutralization process," Control Engineering Practice 15, 2007, special Section on Control Applications in Marine SystemsCAMS2004Control Applications in Marine Systems, pp. 663-672, publisher Elsevier Ltd., Toronto, Ontario, Canada, available at URL http://www.sciencedirect.com/science/article/pii/S0967066106002188.

Hong Liu, et al., "Production of Electricity during Wastewater Treatment Using a Single Chamber Microbial Fuel Cell," Environmental Science & Technology 38, No. 7, 2004, pp. 2281-2285, publisher American Chemical Society, Washington, DC, available at URL http://dx.doi.org/10 1021/es034923g.

Zhuwei Du, et al., "A state of the art review on microbial fuel cells: A promising technology for wastewater treatment and bioenergy," Biotechnology Advances 25, No. 5, 2007, pp. 464-482, publisher Elsevier Ltd., Toronto, Ontario, Canada, available at URL http://www.sciencedirect.com/science/article/pii/S0734975007000054.

Cesar I. Torres, et al., "Proton Transport Inside the Biofilm Limits Electrical Current Generation by Anode-Respiring Bacteria," Biotechnology and Bioengineering vol. 100 No. 5, 2008, pp. 872-881, publisher Wiley Periodicals, Inc., Hoboken, New Jersey, available at URL http://dx.doi.org/10.1002/bit.21821.

Sebastia Puig, et al., "Effect of pH on nutrient dynamics and electricity production using microbial fuel cell," Bioresource Technology 101, 2010, pp. 9594-9599, publisher Elsevier Ltd., Toronto, Ontario, Canada, available at URL http://www.sciencedirect.com/science/article/pii/$0960852410012939.

Yolanda Ruiz, et al., "Enhanced Performance of Bioelectrochemical Hydrogen Production using a pH Control Strategy," ChemSusChem 8 (2), DOI:10.1002/cssc.2014030832015, Jan. 2015, pp. 389-397, publisher Wiley-VCH Verlag GmbH & Co. KGaA, Weinheim, Hoboken, New Jersey, available at URL http://dx.doi.org/10.1002/cssc.201403083.

Kostas Tsakalis, et al., "Loop-Shaping Controller Design Fr01n Input-Output Data: Application to a Paper Machine Simulator," IEEE Transactions on Control Systems Technology, vol. 10, No. 1, Jan. 2002, pp. 127-136, publisher IEEE, Piscataway, NJ.

Elena Grassi, et al. "PID Controller Tuning by Frequency Loop-Shaping: Application to Diffusion Furnace Temperature Control," IEEE Transactions on Control Systems Technology, vol. 8 No. 5, 2000, pp. 842-847, publisher IEEE, Piscataway, NJ.

Kostas S. Tsakalis, et al., "Approximate H loop shaping in PID parameter adaptation," International Journal of Adaptive Control and Signal Processing 27 (1-2), DOI: 10.1002/acs.2350, 2013 pp. 136-152, publisher John Wiley & Sons, Ltd., Hoboken, New Jersey, available at URL http://dx.doi.org/10.1002/acs.2350.

Kostas Tsakalis, et al., "Multivariable controller performance monitoring using robust stability conditions," Journal of Process Control 17 (9), 2007, pp. 702-714, publisher Elsevier Ltd., Toronto, Ontario, Canada.

Kostas Tsakalis, "Integrated Identification and Control for Diffusion/ CVD Furnaces," 6th IEEE International Conference on Emerging Technologies and Factory Automation Proceedings, 1997, pp. 514-519, publisher IEEE, Piscataway, NJ.

Kostas S. Tsakalis, et al., "Identification for PID Control," 2012, pp. 283-317, PID Control in the Third Millennium, Springer London.

Tore K. Gustafsson, et al., "Dynamic Modeling and Reaction Invariant Control of pH," Chemical Engineering Science vol. 38, No. 3, 1983, pp. 389-398, publisher Pergamon Press Ltd., Great Britain, UK, available at URL http://www.sciencedirect.com/science/article/pii/0009250983801572.

Thomas J. McAvoy, "Dynamics of pH in Controlled Stirred Tank Reactor," Industrial & Engineering Chemistry Process Design and Development vol. 11 No. 1, 1972, pp. 68-70, publisher Chemical Engineering Department, University of Massachusetts, Amherst, Massachusetts, available at http://dx.doi.org/10.1021/i260041a013, doi:10. 1021/i260041a013. URL http://dx.doi.org/10.1021/i260041a013.

Ashfaque B.Shafique, et al. "Discrete-Time PID Controller Tuning Using Frequency Loop-Shaping," IFAC Conference on Advances in PIO Control P1D'12, Brescia, Italy, Mar. 28-30, 2012, 6 pages.

Karl J. Astrom, et al., "PID Controllers, 2nd Edition," 1995, 350 pages, publisher Instrument Society of America, Research Triangle Park, North Carolina.

Daniel E. Rivera, et al., "Internal Model Control. 4 PID Controller Design," Ind. Eng. Chem. Procee Des. Dev., 1986, pp. 252-265, publisher American Chemical Society, Washington, DC.

Tufa, et al., "Development of Box-Jenkins type time series models by combining conventional and orthonormal basis filter approaches," Journal of Process Control, 2010, 13 pages.

Gomez, et al., "Identification of block-oriented nonlinear systems using orthonormal bases," Journal of Process Control; 2004, pp. 685-697.

Gomez, et al., "Identification of Nonlinear Systems using Orthonormal Bases," Laboratory for System Dynamics FCEIA, Universidad Nacional de Rosario, Mar. 2003, 14 pages.

Er-Wei Bai, "Identification of an Additive NFIR System and its applications in generalized Hammerstein models," 44th IEEE Conference on Decision and Control and the European Control Conference 2005, Dec. 12-15, 2005, pp. 6406-6411.

Chan, et al., "Identification of MIMO Hammerstein systems using cardinal spline functions," Journal of Process Control, 2006, 12 pages.

Renfro, et al., "Simultaneous Optimization and Solution of Systems Described by Differential/Algebraic Equations," Comput. Chem. Engng, vol. 11. No. 5, 1987, pp. 503-517.

Baumrucker, et al, "MPEC Problem Formulations in Chemical Engineering Applications," National Science Foundation, Jun. 16, 2007, 28 pages.

Balakrishnan et al, "Neurocontrol: A Literature Survey," Mathl. Comput. Modeling, vol. 23, No. 1/2, 1996, pp. 101-117.

Thomas H. Kerr, "Critique of Some Neural Network Architectures and Claims for Control and Estimation," IEEE Transactions on Aerospace and Electronic Systems, vol. 34, No. 2, Apr. 1998, pp. 406-419.

Zilkova, et al., "Nonlinear System Control Using Neural Networks," Acta Polytechnica Hungarica, vol. 3 No. 4, 2006, pp. 85-94.

(56) References Cited

OTHER PUBLICATIONS

Ruanne Delport, "Process Identification Using Second Order Volterra Models for Nonlinear Model Predictive Control Design of Flotation Circuits," University of Pretoria Ltd, Dec. 2, 2004, 161 pages.
Ling, et al., "Control Relevant Model Reduction of Volterra Series Models," Dept of Chemical, Bio, and Materials Engineering; Sep. 4, 1996, 22 pages.
Li, et al., "High-Order Volterra Model Predictive Control and Its Application to a Nonlinear Polymerisation Process," International Journal of Automation and Computing 2, 2005, pp. 208-214.
Eskinat, et al., "Use of Hammerstein Models in Identification of Nonlinear Systems," AIChE Journal, vol. 37, No. 2, Feb. 1991, pp. 255-268.
Totterman, et al., "Support vector method for identification of Wiener models," Journal of Process Control, 2009, pp. 1174-1181.
Wang, et al., "Least squares based and gradient based iterative identification for Wiener nonlinear systems," Signal Processing, 2001; pp. 1182-1189.
Yucai Zhu, "Estimation of an N-L-N Hammerstein-Wiener model," Automatica 38, 2002, pp. 1607-1612.
Bo Wahlberg, "System Identification Using Laguerre Models," IEEE Transactions on Automatic Control, vol. 36 No. 5, May 1991, pp. 551-562.
William H. Kautz, "Network Synthesis for Specified Transient Response," Technical Report No. 209, Research Laboratory of Electronics, Apr. 23, 1952, 183 pages.

* cited by examiner

ADAPTIVE CONTROL TECHNIQUES FOR PH CONTROL OR CONTROL OF OTHER INDUSTRIAL PROCESSES

TECHNICAL FIELD

This disclosure relates generally to industrial process control and automation systems. More specifically, this disclosure relates to adaptive control techniques for pH control or control of other industrial processes.

BACKGROUND

Processing facilities are often managed using industrial process control and automation systems. These types of systems routinely include sensors, actuators, and process controllers. Some of the process controllers typically receive measurements from the sensors and generate control signals for the actuators. Other controllers often perform higher-level functions, such as planning, scheduling, and optimization operations.

Some controllers in an industrial process control and automation system may require tuning or adjustment from time to time. For example, some controllers can implement model predictive control (MPC) or other model-based control techniques, which use models mathematically representing how industrial processes behave in response to changes to their inputs in order to control the industrial processes. As another example, some controllers can implement proportional-integral-derivative (PID) control techniques, which use feedback to identify errors between process variables in industrial processes and desired values in order to minimize the errors over time. If an industrial process changes or a model or PID control loop cannot control the industrial process with enough accuracy, the model or control loop may need to be updated or replaced.

SUMMARY

This disclosure provides adaptive control techniques for pH control or control of other industrial processes.

In a first embodiment, a method includes controlling an industrial process using a process controller. The method also includes determining a robust stability condition (RSC) value during operation of the process controller. The RSC value provides an estimate of performance of the process controller in controlling the industrial process. The method further includes adaptively modifying a characteristic of the process controller based on the RSC value. In a similar manner, a non-transitory computer readable medium could include instructions that, when executed by at least one processing device, cause the at least one processing device to perform the operations of this method.

In a second embodiment, an apparatus includes at least one processing device configured to determine an RSC value during operation of a process controller and adaptively modify a characteristic of the process controller based on the RSC value. The process controller is configured to control an industrial process, and the RSC value provides an estimate of performance of the process controller in controlling the industrial process.

In a third embodiment, a method includes receiving input data associated with an industrial process at multiple process controllers. The method also includes selecting one of the process controllers based on RSC values associated with the process controllers. The RSC values provide estimates of performances of the process controllers in controlling the industrial process. The method further includes outputting one or more control signals from the selected process controller to the industrial process in order to control the industrial process. In a similar manner, a non-transitory computer readable medium could include instructions that, when executed by at least one processing device, cause the at least one processing device to perform the operations of this method.

In a fourth embodiment, an apparatus includes multiple process controllers configured to receive input data associated with an industrial process. Each process controller is also configured to generate one or more control signals for controlling the industrial process. The apparatus also includes a controller configured to select one of the process controllers based on RSC values associated with the process controllers. The RSC values provide estimates of performances of the process controllers in controlling the industrial process. The controller is configured to output the one or more control signals from the selected process controller to the industrial process.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 8C, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, process controllers in industrial process control and automation systems often need to be tuned or adjusted over time. Ideally, this could be done automatically in order to help ensure more accurate control of industrial processes. "Adaptive control" refers to the concept of adaptively changing how an industrial process is controlled over time, such as to compensate for changes in the industrial process itself or to compensate for inaccuracies or other issues with a process controller. Conventional attempts at providing adaptive control suffer from a number of inherent technical challenges, such as bursting, drifting, structural complexities, monitoring issues, and excitation requirements.

This disclosure provides various solutions for providing adaptive control of industrial processes. In particular, this disclosure describes the use of robust stability condition (RSC) metric-based adaptive control solutions for controlling industrial processes. RSC metrics can provide a good estimate of controller performance and, when used for controller adaptation, can result in substantially uniform controller performance at different operating points of an industrial process.

The RSC metric-based control solutions can be used to support different types of adaptive control, such as direct adaptation of a controller (referred to as "direct" adaptive control) and multi-model switching control (MMSC). Direct adaptive control involves making changes directly to a control loop or controller model in order to alter the performance of a process controller. Multi-model switching control involves executing different controllers (either separate hardware devices or separate instances of controller logic in the same device) and selecting one of the controllers, such as the controller that provides the most accurate results for the specific state of an industrial process. Specific implementations of these approaches are described below, such as in relation to control of a pH neutralization process or other pH control process. Of course, these approaches could be used in any other suitable manner.

Figure 1:
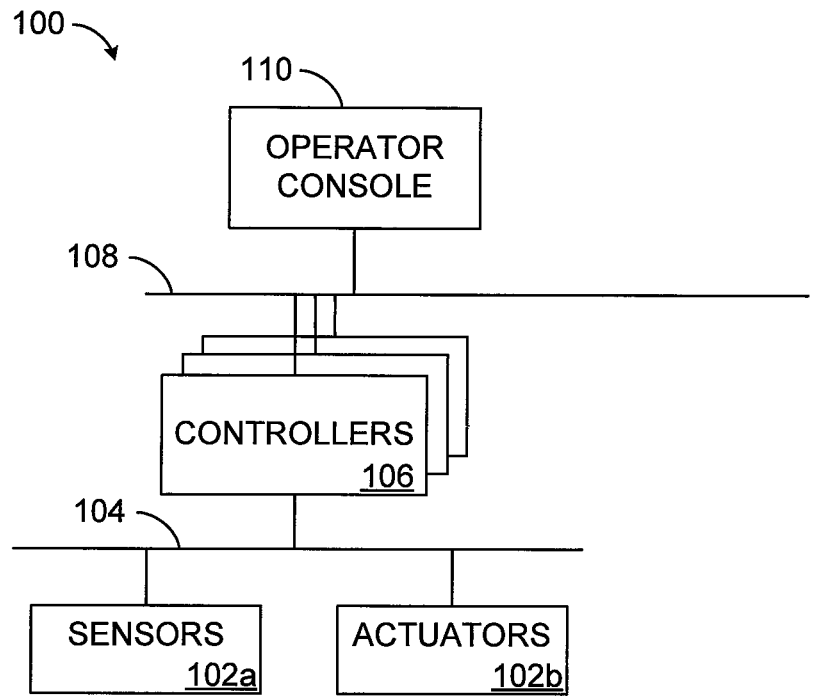
FIGS. 1 and 2 illustrate example industrial process control and automation systems according to this disclosure.
Figure 2:
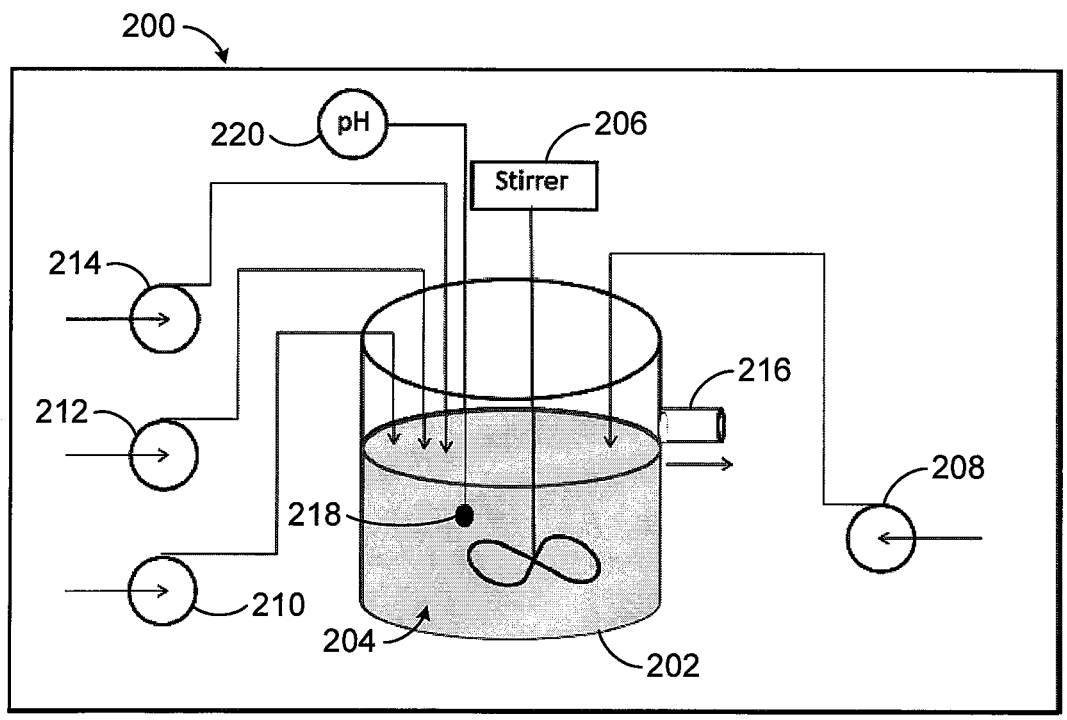

FIGS. 1 and 2 illustrate example industrial process control and automation systems 100 and 200 according to this disclosure. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent at least one Ethernet network, electrical signal network (such as a HART or FOUNDATION FIELDBUS network), pneumatic control signal network, or any other or additional type(s) of network(s).

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. A second set of controllers 106 could be used to optimize the control logic or other operations performed by the first set of controllers. A third set of controllers 106 could be used to perform additional functions.

Controllers 106 are often arranged hierarchically in a system. For example, different controllers 106 could be used to control individual actuators, collections of actuators forming machines, collections of machines forming units, collections of units forming plants, and collections of plants forming an enterprise. A particular example of a hierarchical arrangement of controllers 106 is defined as the "Purdue" model of process control. The controllers 106 in different hierarchical levels can communicate via one or more networks 108 and associated switches, firewalls, and other components.

Each controller 106 includes any suitable structure for controlling one or more aspects of an industrial process. At least some of the controllers 106 could, for example, represent proportional-integral-derivative (PID) controllers or multivariable controllers, such as Robust Multivariable Predictive Control Technology (RMPCT) controllers or other types of controllers implementing model predictive control (MPC) or other advanced predictive control. As a particular example, each controller 106 could represent a computing device running a real-time operating system, a WINDOWS operating system, or other operating system.

Operator access to and interaction with the controllers 106 and other components of the system 100 can occur via various operator consoles 110. Each operator console 110 could be used to provide information to an operator and receive information from an operator. For example, each operator console 110 could provide information identifying a current state of an industrial process to the operator, such as values of various process variables and warnings, alarms, or other states associated with the industrial process. Each operator console 110 could also receive information affecting how the industrial process is controlled, such as by receiving setpoints for process variables controlled by the controllers 106 or other information that alters or affects how the controllers 106 control the industrial process. Each operator console 110 includes any suitable structure for displaying information to and interacting with an operator.

As noted above, one or more of the process controllers 106 could implement an RSC metric-based adaptive control approach for controlling one or more industrial processes. As described in more detail below, this could take the form of direct adaptation of a controller 106 or multi-model switching control within a single controller 106 or with multiple controllers 106.

As shown in FIG. 2, the system 200 includes various components that support a pH neutralization process or other pH control process. In FIG. 2, a reactor 202 contains material 204 that is ideally controlled so that the pH of the material 204 has a desired value or is within a desired range of values. In this example, the reactor 202 includes or is associated with at least one stirrer 206 that mixes different materials in the reactor 202 so that the resulting material 204 is substantially uniform throughout. The reactor 202 includes any suitable structure configured to hold materials, such as a continuous stirred-tank reactor (CSTR).

Various inlet streams of material to the reactor 202 are provided by pumps 208-214. The pump 208 provides a base material into the reactor 202, and the pump 210 provides an acid material into the reactor 202. The pumps 212 and 214 provide one or more buffer materials into the reactor 202. Note, however, that there could be multiple pumps supplying different acid materials, multiple pumps supplying different base materials, and/or a single pump providing buffer material. An overflow outlet 216 provides an outlet stream from the reactor 202. Each pump 208-214 includes any suitable structure for providing a flow of material. The overflow outlet 216 includes any suitable structure for providing material from a reactor.

At least one pH probe 218 can be inserted into the reactor 202 and used to measure the pH of the material 204 in the reactor 202. Measurements of pH are provided to a process controller 220, which uses the pH measurements to control the operations of the pumps 208-214. Ideally, the process controller 220 uses the pH measurements to control the operation of the pumps 208-214 so that processed material output from the reactor 202 has a pH at a desired level or within a desired range (such as a pH of between 6 and 8). Each pH probe 218 includes any suitable structure for measuring the pH of material. The process controller 220 includes any suitable structure for controlling components in order to adjust the pH of material. In some embodiments, the process controller 220 denotes a PID controller. Although not shown, the process controller 220 could interact with other components, such as by interacting with an operator console 110 via a network 108.

The control of pH can play an important role in various industrial processes, such as wastewater treatment, biotechnical processes like microbial fuel cells, and electro-chemical cells. Because of its nonlinear and time-varying nature, pH control can be very challenging. The nonlinear nature of a pH control process can make linear controllers ineffective at controlling pH over a wide range of values, and the time-varying nature of the pH control process can make linear controllers ineffective even at a single operating point. While some nonlinear controllers have been proposed, these nonlinear controllers generally fail to compensate for the time-varying behavior of the process, such as when there is a change in the buffering capacity of the reactor 202. Thus, the process controller 220 could implement an RSC metric-based adaptive control approach for controlling the pH of material 204 in a reactor 202. As described in more detail below, this could take the form of direct adaptation of the controller 220 or multi-model switching control within the controller 220 or with multiple instances of the controller 220.

Although FIGS. 1 and 2 illustrate examples of industrial process control and automation systems 100 and 200, various changes may be made to FIGS. 1 and 2. For example, industrial control and automation systems come in a wide variety of configurations. The systems 100 and 200 shown in FIGS. 1 and 2 are meant to illustrate example operational environments in which adaptive control techniques can be used. FIGS. 1 and 2 do not limit this disclosure to any particular configuration or operational environment.

Figure 3:
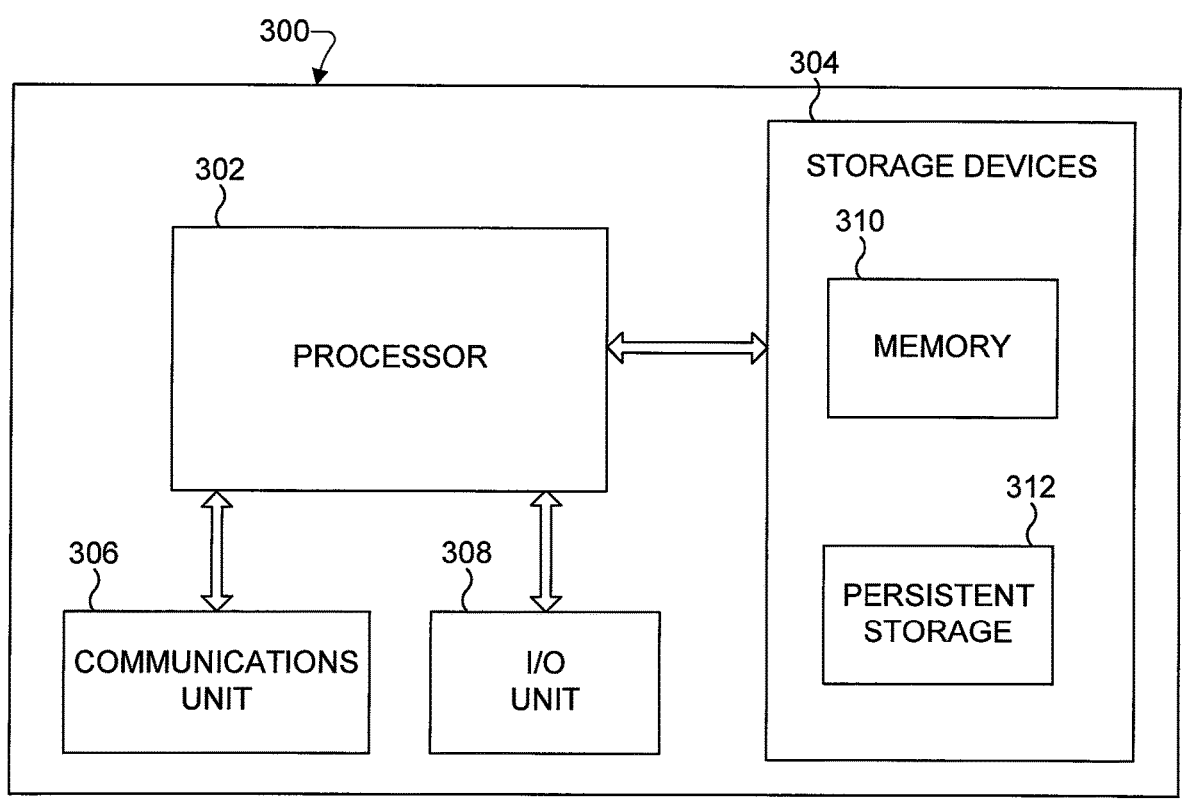
FIG. 3 illustrates an example device supporting adaptive control techniques for pH control or control of other industrial processes according to this disclosure.

FIG. 3 illustrates an example device 300 supporting adaptive control techniques for pH control or control of other industrial processes according to this disclosure. The device 300 could, for example, denote the controllers 106 or operator consoles 110 in FIG. 1 or the controller 220 in FIG. 2. However, the device 300 could be used in any other suitable system, and the controllers 106 and 220 and operator consoles 110 could be implemented in any other suitable manner.

As shown in FIG. 3, the device 300 includes at least one processor 302, at least one storage device 304, at least one communications unit 306, and at least one input/output (I/O) unit 308. Each processor 302 can execute instructions, such as those that may be loaded into a memory 310. Each processor 302 denotes any suitable processing device, such as one or more microprocessors, microcontrollers, digital signal processors, application specific integrated circuits (ASICs), field programmable gate arrays (FPGAs), or discrete circuitry.

The memory 310 and a persistent storage 312 are examples of storage devices 304, which represent any structure(s) capable of storing and facilitating retrieval of information (such as data, program code, and/or other suitable information on a temporary or permanent basis). The memory 310 may represent a random access memory or any other suitable volatile or non-volatile storage device(s). The persistent storage 312 may contain one or more components or devices supporting longer-term storage of data, such as a read only memory, hard drive, Flash memory, or optical disc.

The communications unit 306 supports communications with other systems or devices. For example, the communications unit 306 could include at least one network interface card or wireless transceiver facilitating communications over at least one wired or wireless network. The communications unit 306 may support communications through any suitable physical or wireless communication link(s).

The I/O unit 308 allows for input and output of data. For example, the I/O unit 308 may provide a connection for user input through a keyboard, mouse, keypad, touchscreen, or other suitable input device. The I/O unit 308 may also send output to a display, printer, or other suitable output device.

Although FIG. 3 illustrates one example of a device 300 supporting adaptive control techniques for pH control or control of other industrial processes, various changes may be made to FIG. 3. For example, various components in FIG. 3 could be combined, further subdivided, or omitted and additional components could be added according to particular needs. Also, computing devices come in a wide variety of configurations, and FIG. 3 does not limit this disclosure to any particular configuration of computing device.

The remainder of this patent document provides details regarding example implementations of two adaptive control techniques, namely direct adaptive control and multi-model switching control. The details provided below are for illustration only and do not limit this disclosure to the specific implementations of these two adaptive control techniques.

Direct Adaptive Control

As noted above, direct adaptive control involves making changes directly to a control loop or controller model in order to alter the performance of a process controller. For simplicity, the following discussion describes direct adaptive control as involving a single characteristic of a process controller that is adaptively modified to account for changes to an industrial process, namely a pH control process. However, this is for illustration and explanation only.

Figure 4:
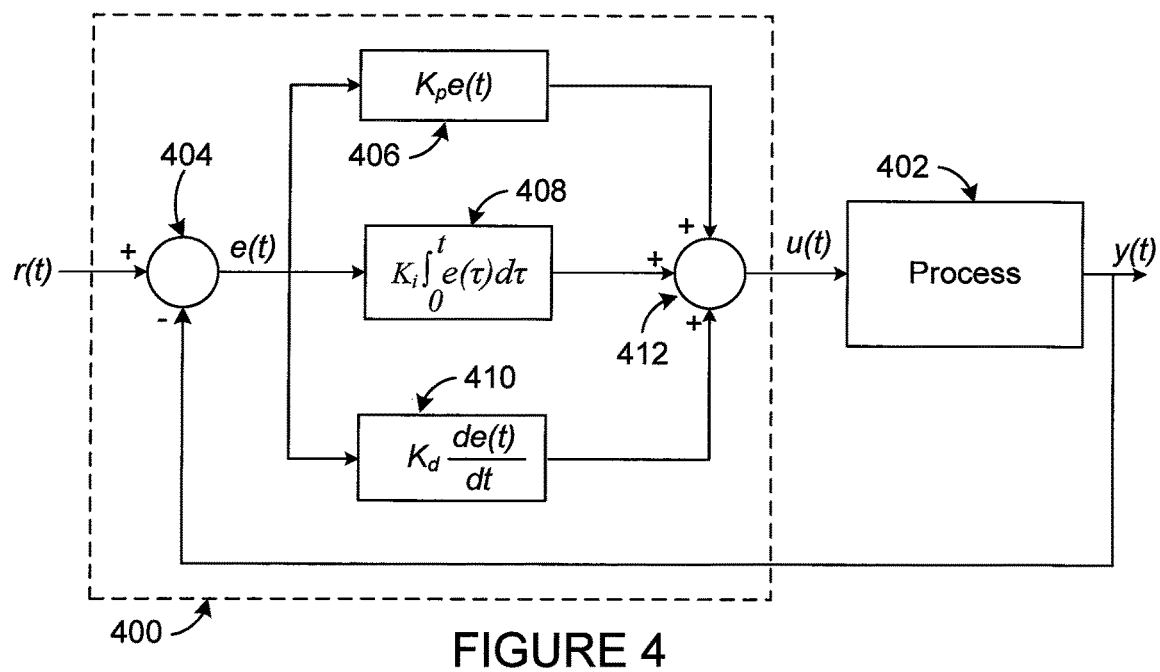
FIG. 4 illustrates an example control loop subject to direct adaptive control according to this disclosure.

FIG. 4 illustrates an example control loop 400 subject to direct adaptive control according to this disclosure. In FIG. 4, the control loop 400 is used in conjunction with an industrial process 402, which could denote any suitable industrial process (such as a pH neutralization process or other pH control process).

As shown in FIG. 4, the control loop 400 implements a PID control loop in which an output y(t) of the process 402 is controlled to be at or near a desired setpoint r(t). The control loop 400 includes a combiner 404 that identifies a difference or error e(t) between the setpoint r(t) and measurements of the output y(t) (such as from a pH probe 218). Three function blocks 406-410 implement the proportional, integral, and derivative calculations for the control loop 400. For example, the function block 406 accounts for the current value of the error by scaling the error with $K_p$, which denotes the proportional gain of the control loop 400. The function block 408 accounts for prior values of the error by integrating the error over time and scaling the result with $K_i$ which denotes the integral gain of the control loop 400. The function block 410 accounts for potential future values of the error by calculating a derivative of the error and scaling the result with $K_d$, which denotes the derivative gain of the control loop 400. Outputs of the function blocks 406-410 are combined by a combiner 412, which generates a control signal u(t) for adjusting the process 402.

The control loop 400 could be implemented in any suitable manner. For example, in some embodiments, each of the components 404-412 of the control loop 400 could be implemented using software or firmware instructions, such as instructions executed by at least one processor 302 of a controller 106 or 220. In other embodiments, at least some of the components 404-412 could be implemented using hardware components of a controller 106 or 220.

As described below, the process 402 could be adaptively controlled by directly altering one or more characteristics of the control loop 400. For example, one or more of the gains $K_p$, $K_i$, and $K_d$ could be varied using frequency loop-shaping (FLS), and an RSC metric can be used during the loop-shaping or other tuning. The tuning could be performed by the controller 106 or 220 that is executing the control loop 400 or by another device external to the controller 106 or 220 (such as an operator console 110). One result of the tuning is that the operation of the control loop 400 is altered to account for things like setpoint changes or changes to the underlying industrial process 402.

Although FIG. 4 illustrates one example of a control loop 400 subject to direct adaptive control, various changes may be made to FIG. 4. For example, in some instances, one of the function blocks 406-410 could be omitted if its functionality is not required, such as when the function block 410 is omitted to create a PI control loop instead of a PID control loop.

Figure 5:
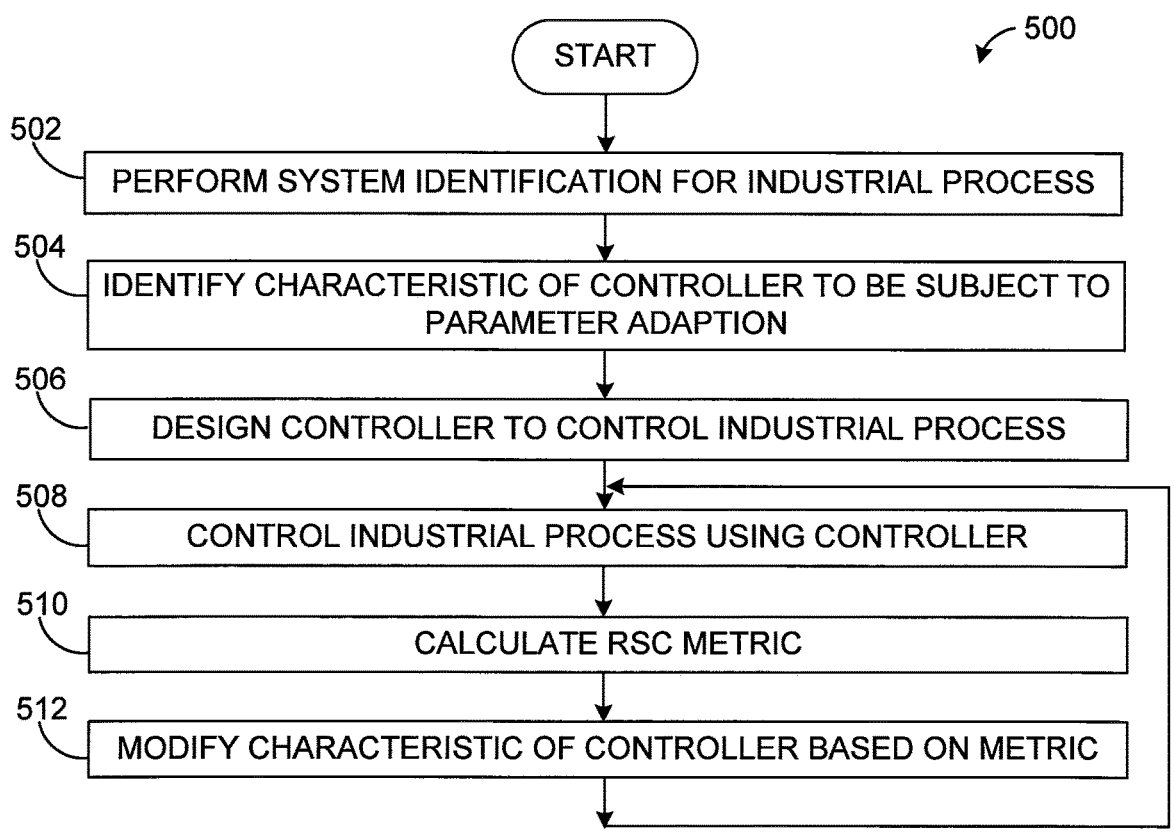
FIG. 5 illustrates a first example method supporting adaptive control of an industrial process according to this disclosure.

FIG. 5 illustrates a first example method 500 supporting adaptive control of an industrial process according to this disclosure. In particular, FIG. 5 illustrates an example method 500 for direct adaptive control of an industrial process (such as a pH neutralization process or other pH control process). For ease of explanation, the method 500 is described as being used with the control loop 400 of FIG. 4 in the system 100 of FIG. 1 or the system 200 of FIG. 2. However, the method 500 could be used with any suitable control loop, controller, and system.

As shown in FIG. 5, system identification is performed for an industrial process at step 502. This could include, for example, collecting input and output data associated with the industrial process 402 and identifying a process model representing the industrial process 402 using the data. One straightforward approach for system identification is to carry out identification experiments and obtain a process model (such as a Laplace transfer function). This can involve perturbing the industrial process 402 during step testing and fitting a model to recorded input-output time-series data. Many approaches are known for system identification, including tools for fitting a model to process data. Example system identification procedures are described in the following documents (all of which are hereby incorporated by reference in their entirety):

Tsakalis et al., "Integrated Identification and Control for Diffusion/CVD Furnaces," IEEE 6th Int. Conf. ETFA, pp. 514-519, 1997;

Tsakalis et al., "Control Oriented Uncertainty Estimation in System Identification," 17th IASTED Int. Conf. MIC, 1998;

Tsakalis et al., "Identification for PID Control," PID Control in the Third Millennium, pp. 283-317, 2012;

Tsakalis et al., "Loop-Shaping Controller Design from Input-Output Data: Application to a Paper Machine Simulator," IEEE Transactions on Control Systems Technology, pp. 127-136, 2002;

Zhan et al., "System Identification for Robust Control," American Control Conference, 2007, ACC '07, pp. 846-851, 9-13 Jul. 2007;

Alvarez et al., "pH Neutralization Process as a Benchmark for Testing Nonlinear Controllers," Industrial & Engineering Chemistry Research 2001 40 (11), pp. 2467-2473; and Åström et al., "PID controllers: theory, design, and tuning," Research Triangle Park, N.C.: Instrument Society of America, 1995.

A characteristic of a process controller to be subjected to direct parameter adaptation is identified at step 504. This could include, for example, a user or automated tool identifying a characteristic of the process controller 106 or 220 to be controlled. The characteristic could denote any suitable characteristic of the controller 106 or 220. For example, as described below, the characteristic could denote the gain of a controller that controls a pH neutralization process or other pH control process. The characteristic can be identified in any suitable manner, such as by analyzing the process model from the system identification and identifying the primary characteristic of the controller 106 or 220 that affects controller accuracy.

A controller is designed to control the industrial process at step 506. This could include, for example, executing a design tool to identify the $K_p$, $K_i$, and $K_d$ gains for a PID control loop 400. Various tools and approaches are known for designing a PID controller or other controller, including those in the various references incorporated above. As part of the controller design, an optimization problem can be solved to identify one or more parameters for the controller 106 or 220. For instance, an optimization problem could be solved to identify the controller gain of the controller 106 or 220. The optimization problem incorporates at least one RSC metric, allowing the parameter(s) of the controller 106 or 220 to be directly adapted during operation of the controller.

The controller is placed into operation and used to control the industrial process at step 508. This could include, for example, using the identified controller gains or other parameters in the process controller 106 or 220 to control the pH of material 204 in the reactor 202. The process controller 106 or 220 could implement the control loop 400 using the identified controller gains or other parameters.

A robust stability control metric is calculated at step 510. This could include, for example, the controller 106 or 220 calculating any suitable RSC metric. According to the small-gain theorem, a closed-loop system is stable for all stable uncertainties that satisfy the condition:

$$|\Delta(j\omega)||M(j\omega)| < 1 \text{ for all } \omega \quad (1)$$

where Δ denotes a frequency response of the uncertainty (whose bounds are available) and M denotes the nominal closed-loop transfer function. This inequality is referred to as a robust stability condition for a feedback system. To help guarantee robust stability, a controller C for a nominal process model $P_0$ with a multiplicative uncertainty $\Delta_m$ could be designed such that the robust stability condition in Equation (2) is satisfied.

$$|\Delta m(j\omega)||T(j\omega)| < 1 \text{ for all } \omega \quad (2)$$

This condition implies that the closed-loop bandwidth cannot be higher than that of the inverse multiplicative uncertainty and that excessive peaks (resonances) should be avoided. While exact specifications depend on detailed estimates of the uncertainty, traditional feedback design simplifies the problem by assuming smooth and well-behaved frequency responses, effectively converting the bandwidth constraint into a crossover frequency and the peaking constraint into a phase-margin specification. The choice of design procedure is not important as long as the designed controller satisfies a robust stability condition imposed by uncertainty. In some embodiments, the design of a PID controller can be performed using frequency loop-shaping. In this method, PID parameters are tuned to achieve a loop transfer function close to a chosen target loop. Details of example frequency loop-shaping can be found, for example, in Grassi et al., "Integrated system identification and PID controller tuning by frequency loop-shaping," IEEE Transactions on Control Systems Technology, vol. 9, no. 2, pp. 285-294, 2001 (which is hereby incorporated by reference in its entirety). Additional details regarding a suitable RSC metric are provided below.

The RSC metric is used to modify the characteristic of the controller at step 512. This could include, for example, using the calculated RSC metric as part of the optimization problem in order to identify one or more new controller gains or other controller parameters to be used by the controller. The method 500 can then return to step 508 in order to continue controlling the industrial process using the adaptively-updated controller.

Although FIG. 5 illustrates a first example of a method 500 supporting adaptive control of an industrial process, various changes may be made to FIG. 5. For example, while shown as a series of steps, various steps in FIG. 5 could overlap, occur in parallel, occur in a different order, or occur any number of times.

Example of Direct Adaptive Control for pH Control Process

The following presents a specific example of how the above-described direct adaptive control technique could be used. It has been shown that the gain for a pH system can change with the system's operating point. It has also been shown that a linear controller destabilizes the system if operated at a different pH than the pH for which the linear controller was designed. One conventional approach involves gain-scheduling based on measured signals, meaning the controller gain is adjusted based on sensor measurements. However, in the case of pH control, the only available sensor measurement may be the pH of material, and gain-scheduling based solely on pH measurements may be insufficient. This is because significant variations in the gain of the pH control process can occur, such as in response to operating point variations or changes in the buffering capacity of the pH process. The disclosure below focuses on adaptive control algorithms that handle gain variations from both operating point variations and buffer variations.

For a pH neutralization process, only the gain of the process may change significantly, so a single parameter adaption (for the controller gain) may be sufficient to compensate for gain variations in the process. The need to adapt a single parameter can be confirmed by modeling the pH neutralization process, such as by using reaction-invariant modeling, and analyzing the model at different pH operating points and with variations in buffer flows. From this, it can be shown that only the gain of the process changes significantly, so only the controller gain may need to be directly adapted. The low excitation requirement of single parameter adaptation and the low computational requirement for direct adaptation of that single parameter make this attractive for implementation in industrial processes.

Consider a 500 mL continuous stirred tank reactor 202 with inlet streams of a strong acid (1 M HCl), weak acid #1 (100 mM $H_2CO_3$), weak acid #2 (100 mM $H_3PO_4$), and a strong base (1 M NaOH). Let $q_1$, $q_2$, $q_3$, and $q_4$ denote their respective flow rates. The combination of the strong and weak acids could simulate wastewater, and the flow rate of the strong base can be manipulated to control the pH of the material 204 in the reactor 202. A variation of the buffering capacity of the wastewater can be simulated be varying the flows of the weak acids. The volume of the material 204 in the reactor 202 and its temperature can be kept substantially constant. The pH of the material 204 in the reactor 202 is measured by the pH probe 218, and it is assumed that perfect mixing occurs in the reactor 202 and that ions are completely soluble. All irreversible reactions and reaction invariants are listed below.

A dynamic model for the pH process can be derived from the component material balance for reaction invariants ($W_{a5}$, $W_{b5}$, and $W_{c5}$) and the algebraic equation relating the pH and reaction invariants. Example operating conditions of the system 200 are listed in Table 1.

TABLE 1

| Symbol | Value |
| --- | --- |
| $K_{a1}$ | $4.47 \times 10^{-7}$ |
| $K_{a2}$ | $5.62 \times 10^{-11}$ |
| $K_{a3}$ | 0.0072 |
| $K_{a4}$ | $1.6982 \times 10^{-7}$ |
| $K_{a5}$ | $2.6915 \times 10^{-12}$ |
| $q_1$ | 2.45 mL/min |
| $q_2$ | 2.45 mL/min |
| $q_3$ | 2.4051 mL/min |
| $q_4$ | 2.4051 mL/min |
| $W_{a1}$ | 1M |
| $W_{a2}$ | −0.1M |
| $W_{a3}$ | −0.181M |
| $W_{a4}$ | −1M |
| $W_{b1}$ | 0M |
| $W_{b2}$ | 0.1M |
| $W_{b3}$ | 0M |
| $W_{b4}$ | 0M |
| $W_{c1}$ | 0M |
| $W_{c2}$ | 0M |
| $W_{c3}$ | 0.1M |
| $W_{c4}$ | 0M |
| V | 500 mL |

A nonlinear model for this process can be described by mass-balance and charge-balance equations (Equations (3)-(5)) and the relationship between reaction invariants and pH (shown in Equations (A.17) and (A.13) below).

$$\frac{dW_{a5}}{dt} = \frac{1}{V}[q_1(W_{a1} - W_{a5}) + q_2(W_{a2} - W_{a5}) + q_3(W_{a3} - W_{a5}) + q_4(W_{a4} - W_{a5})] \quad (3)$$

-continued $$\frac{dW_{b5}}{dt} = \frac{1}{V} [q_1(W_{b1} - W_{b5}) + q_2(W_{b2} - W_{b5}) + q_3(W_{b3} - W_{b5}) + q_4(W_{b4} - W_{b5})] \quad (4)$$

$$\frac{dW_{c5}}{dt} = \frac{1}{V} [q_1(W_{c1} - W_{c5}) + q_2(W_{c2} - W_{c5}) + q_3(W_{c3} - W_{c5}) + q_4(W_{c4} - W_{c5})] \quad (5)$$

The pump 208 can be used to pump the base material into the reactor 202, and its flow rate can be controlled, such as by varying a voltage across a control terminal of the pump 208. The pump 208 can interface with the controller 220 using a digital-to-analog converter (DAC) if necessary, such as to convert between digital values (like 12-bit values) used by the controller 220 and a voltage signal (like 0-5V) used by the pump 208. The relation between the base stream flow rate and the DAC values could be described as:

$$\text{Base flow (mL/min)} = 7.45 \times \frac{DAC \text{ Value}}{4095} \quad (6)$$

In the following discussion, "plant input" refers to the DAC value, and "plant output" refers to the pH of the material 204 in the reactor 202.

The nonlinear model of the pH process can be linearized at different pH operating points and for the variations of buffering capacity. The following example cases are considered for the buffer flow rates and are used to simulate variations of the buffering capacity.

Case 1: $q_2$=2.5 mL/min and $q_3$=2.5 mL/min
Case 2: $q_2$=0 mL/min and $q_3$=2.5 mL/min
Case 3: $q_2$=2.5 mL/min and $q_3$=0 mL/min
Case 4: $q_2$=0 mL/min and $q_3$=0 mL/min Transfer functions of the linearized plants for these four cases can be of the following structure.

$$P(s) = \frac{K_p}{\tau s + 1} e^{(-s/6)} \quad (7)$$

Here, $K_p$ is the gain and $\tau$ is the time constant of a linearized plant. The values of the gains of the linearized plants for all cases are listed in Table 2, and the values of the time constants for all cases are listed in the Table 3.

TABLE 2

| | Gain | | | |
|---|---|---|---|---|
| pH | Case 1 | Case 2 | Case 3 | Case 4 |
| 3.0 | 0.0193 | 0.0213 | 0.0994 | 0.1526 |
| 4.0 | 0.1282 | 0.1636 | 0.4123 | 1.5210 |
| 5.0 | 0.0498 | 0.1610 | 0.0704 | 35.9761 |
| 6.0 | 0.0103 | 0.0263 | 0.0128 | 69.6918 |
| 7.0 | 0.0075 | 0.0138 | 0.0174 | 69.7730 |
| 8.0 | 0.0392 | 0.0545 | 0.1095 | 69.6889 |
| 9.0 | 0.0484 | 0.3299 | 0.0564 | 35.9785 |
| 10.0 | 0.0115 | 0.0994 | 0.0105 | 1.5188 |
| 11.0 | 0.0069 | 0.0170 | 0.0191 | 0.1468 |
| 12.0 | 0.0044 | 0.0084 | 0.0098 | 0.0098 |

TABLE 3

| | Time Constant | | | |
|---|---|---|---|---|
| pH | Case 1 | Case 2 | Case 3 | Case 4 |
| 3.0 | 53.1465 | 67.9129 | 71.0399 | 102.1428 |
| 4.0 | 52.9397 | 67.6015 | 70.9637 | 102.0510 |
| 5.0 | 52.8431 | 67.5333 | 70.8576 | 102.0418 |
| 6.0 | 52.2959 | 67.2452 | 70.1771 | 102.0409 |
| 7.0 | 50.9721 | 66.1652 | 68.9114 | 102.0408 |
| 8.0 | 50.3507 | 65.4839 | 68.5080 | 102.0407 |
| 9.0 | 50.2038 | 65.3668 | 68.3452 | 102.0398 |
| 10.0 | 49.7766 | 65.2938 | 67.6048 | 102.0306 |
| 11.0 | 48.9110 | 64.8451 | 66.4113 | 101.9388 |
| 12.0 | 47.7088 | 63.2002 | 65.5113 | 101.0275 |

The gain values of the linearized plants are directly related to the slope of a titration curve. Thus, it can be shown that the gain of the linearized plants is a function of the operating pH and buffering capacity of the material 204 in the reactor 202. Moreover, it can be shown that the variation in the gain with respect to the operating pH and buffering capacity is significantly high. On the other hand, the time constants of the plants are directly related to retention time. The variation in the time constants is minimal compared to the gain variation, and the time constant of all of the linearized plants could be significantly shorter than the settling time of a pH controller. As a result, the variation in the time constant could have little or no impact on the performance of a control loop. It could therefore be concluded that only the gain of the system changes significantly, and direct adaptation of only the controller gain could be sufficient to compensate for gain variations of the plant.

Based on this example, the following provides a description of the formulation of controller gain adaptation as part of a modified approximate $H_\infty$ loop shaping in a PID parameter adaptation process. A summary of the FLS tuning approach for PID control loops using an RSC metric and estimation of the RSC metric online using plant input-output data is described below.

Let C be a proportional-integral (PI) controller designed for a nominal plant with a transfer function of $C(s)=K_p+K_i/s$, where $K_p$ and $K_i$ are the proportional and integral gains, respectively. For gain adaptation purposes, the transfer function of the PI controller can be rewritten as:

$$C(s) = K \frac{(s+a)}{s} = K\tilde{C} \quad (8)$$

where $K=K_p$, $a=K_i/K_p$, and $\tilde{C}=(s+a)/s$. An FLS tuning objective is to determine the gain K of the PI controller so that the open-loop transfer function CG is close to a target L in a weighted $L_\infty$ sense. The FLS tuning from Equation (B.4) below is adjusted for gain adaptation, and the solution for the gain K of the controller is a solution of the following optimization problem:

$$K = \arg\min_{K \in M} \|S(GK\tilde{C} - L)\|_\infty \quad (9)$$

where $S=(1+L)^{-1}$ is the target sensitivity of the controller and M is the set of controller gain values. M can be defined as the closed interval $M=[K_{min}, K_{max}]$, where $K_{min}$ is the minimum controller gain and $K_{max}$ is the maximum controller gain.

The online direct adaptive algorithm in Equation (9) can be modified into a minimization of an RSC estimate as described in Equation (B.6) below. The modified equation can be expressed as:

$$K = \underset{K \in M}{\arg\min} \max_i \frac{\|KS\tilde{C}F_i y - TF_i u\|_{2,\delta} - \|d\|}{\|F_i u\|_{2,\delta}} \quad (10)$$

The optimization problem in Equation (10) can be solved recursively for each time step k as follows.

$$\min_{K \in M} \max_i \frac{J_{i,k}}{m_{i,k}} \quad (11)$$

$$J_{i,k}(K_k) = \sum_{n=0}^{k} \lambda^{k-n} |z_{i,n} - w_{i,n}^T K_k|^2$$

$$m_{i,k+1} = \lambda m_k + |[F_i u]_{k+1}|^2$$

where $z_{i,n} = [TF_i u]_n$, $w_{i,n} = [S\tilde{C}F]_n$, and $\lambda$ is a forgetting factor.

Various optimization solvers can be used to solve the above optimization problem. One example solver is described in Tsakalis et al., "Approximate $H_\infty$ Loop Shaping in PID Parameter Adaptation," International Journal of Adaptive Control and Signal Processing 27 (1-2) (2013), pg. 136-152 (which is hereby incorporated by reference). However, changes are made to the approach described in that document as follows. For faster convergence (apart from the forgetting factor), a co-variance term P is reset periodically if one of the following conditions is met: the setpoint is changed more than a threshold, the time from the last reset is more than a threshold, or there is a significant change in the pH readings (for disturbances). Also, the value of the co-variance term P represents confidence (sufficiency of excitation) in the parameter estimate, and the estimated parameter is used in the controller only if the value of the sum of squares of P for all filters is more than a threshold. In addition, to avoid bias in the parameter estimate because of disturbances and noise, the plant input-output pair used in the adaptation algorithm is filtered using a band-pass filter that attenuates frequencies of these signals outside the frequency of interest.

Initially, system identification and PI controller design for a nominal plant can occur. The nominal plant model can be obtained at a specific operating pH (such as pH=6) by fitting a model to input-output data from a system identification experiment, and a nominal PI controller can be designed for the nominal plant model.

Various system identification algorithms are known and can use input-output data from a system identification experiment to fit a model, and an estimation error can be used to obtain an estimate of uncertainty. For system identification to work properly, an input signal used in the identification experiment could have persistence of excitation. There are different methods of designing "plant-friendly" inputs for an identification experiment with persistence of excitation. One common method involves the use of pseudo-random binary sequence (PRBS) signals. Input-output data can be used to identify the parameters of a transfer function for the plant, and a PI controller can be designed for the identified plant, such as by using an FLS algorithm. The parameters for the nominal PI controller can then be obtained, such as by minimizing an RSC metric for a chosen loop shape.

As a specific example of this functionality, assume that input-output data is used to generate a transfer function $G_{esp6}$ as follows:

$$G_{exp6}(s) = \frac{7.6305 \times 10^{-5}(-s + 1.53)}{(s + 4.261)(s + 0.01822)} \quad (12)$$

A PI controller ($C_{exp6}$) can be designed for this plant using an online FLS algorithm. A target loop ($L_{exp6}$) chosen for the PI controller design with a closed-loop bandwidth specification of 0.6 rad/min can be expressed as:

$$L_{exp6}(s) = \frac{0.82734(s + 4.284)(s + 0.4087)}{s(s + 4.261)(s + 0.01822)} \quad (13)$$

The PI parameters for the nominal controller can be obtained by minimizing the RSC metric for the above-chosen loop shape. The transfer function of PI controller can be given as:

$$C_{exp6}(s) = \frac{21243(s + 0.273)}{s} \quad (14)$$

To validate this controller design, a co-prime factor uncertainty estimate can be used, and a plot of the small gain condition (the RSC) can be created. If the small gain condition value is less than one, the controller design for the nominal plant is robust enough to handle the uncertainty that corresponds to the estimation error. In addition, the optimization problem in Equation (10) can be solved recursively for each time step k in order to adapt the controller design.

Experimental and simulation results confirm that this approach can function adequately to provide effective control over a pH process. To provide excitation for adaptation, a setpoint signal identifying a desired pH target can be superimposed with a small magnitude square wave or other wave. Through these results, it can be seen that the direct adaptive control approach is able to adapt to process gain changes at different operating points (different pH levels) and buffering capacities. After controller gain convergence, the closed-loop system response can be very close to the target response, so it can be concluded that the direct adaptive control approach can achieve substantially uniform performance as process conditions vary. It can also be concluded from these results that, using a single data-driven linear model (obtained using a system identification experiment) along with the direct adaptive control approach, it is possible to control pH over a wide operating region. Moreover, the implementation of the direct adaptive control algorithm can be computationally inexpensive, allowing the algorithm to be used in a wide range of systems and devices.

From the experimental and simulation results, it can also be shown that, following a setpoint transition to the gain of the process controller 220, the process controller 220 is adapted to a steady-state value that gives performance close to the desired target. It may take several cycles of the superimposed square wave or other wave to obtain convergence for the controller gain parameter. However, this still establishes that the direct adaptive control algorithm can perform well in achieving substantially uniform performance and that small excitations (such as a small square wave) are sufficient to achieve this substantially uniform performance.

In conclusion, the direct adaptive control approach avoids problems associated with conventional approaches, such as bursting and drifting. Because there is only one parameter (such as controller gain) being updated, the excitation requirement for updating the parameter can be modest. Furthermore, substantially the same level of performance can be obtained by a process controller at various operating points. While many controllers use objective functions that do not have meaningful performance criteria, one or more performance targets are explicitly considered in this approach via use of the RSC metric, which helps to improve controller performance and stability at various operating points.

Multi-Model Switching Control

As noted above, multi-model switching control involves executing different controllers (either separate hardware devices or separate instances of controller logic in the same device) and selecting one of the controllers. The selected controller could, for example, denote the controller that provides the most accurate results for the specific state of an industrial process. As the state of the industrial process changes, a different controller could provide the most accurate results and be selected. For simplicity, the following discussion describes multi-model switching control as involving one or more characteristics that are adaptively modified to account for changes to an industrial process, namely a pH control process. However, this is for illustration and explanation only.

Figure 6:
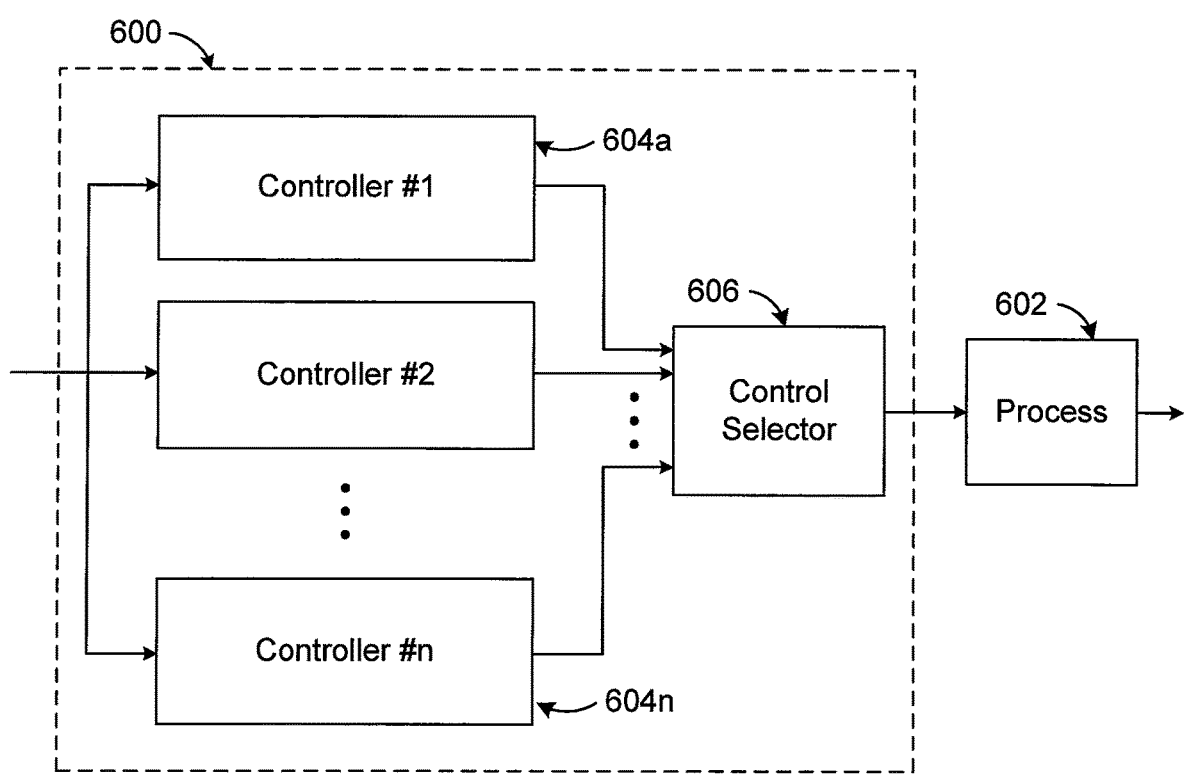
FIG. 6 illustrates an example multi-model switching control loop supporting adaptive control of an industrial process according to this disclosure.

FIG. 6 illustrates an example multi-model switching control loop 600 supporting adaptive control of an industrial process according to this disclosure. In FIG. 6, the control loop 600 is used in conjunction with an industrial process 602, which could denote any suitable industrial process (such as a pH neutralization process or other pH control process).

The control loop 600 here includes a controller bank containing multiple controllers 604a-604n. Each of the controllers 604a-604n receives input data (such as one or more setpoints and one or more feedback signals) and operates to generate one or more output signals for the industrial process 602. However, the controllers 604a-604n are configured differently so that their control calculations and their output signals are different. For example, different controllers 604a-604n could denote PID controllers with different controller gains. As another example, different controllers 604a-604n could denote MPC or other model-based controllers that operate using different process models or different optimization functions.

The output signals from the controllers 604a-604n are provided to a controller or control selector 606. The control selector 606 operates to provide the output signal(s) from a selected one of the controllers 604a-604n to the industrial process 602. Multi-model switching control relies upon some metric to perform switching between the controllers 604a-604n in the controller bank. A high correlation between RSC metrics and the performances of closed-loop systems can make the RSC metrics useful in monitoring controller performance. Thus, the control selector 606 can use an RSC metric to identify the controller output to be provided to the industrial process 602.

Although FIG. 6 illustrates one example of a multi-model switching control loop 600 supporting adaptive control of an industrial process, various changes may be made to FIG. 6. For example, the control loop 600 could include any suitable number of controllers in the controller bank, and those controllers could have any suitable differences.

Figure 7:
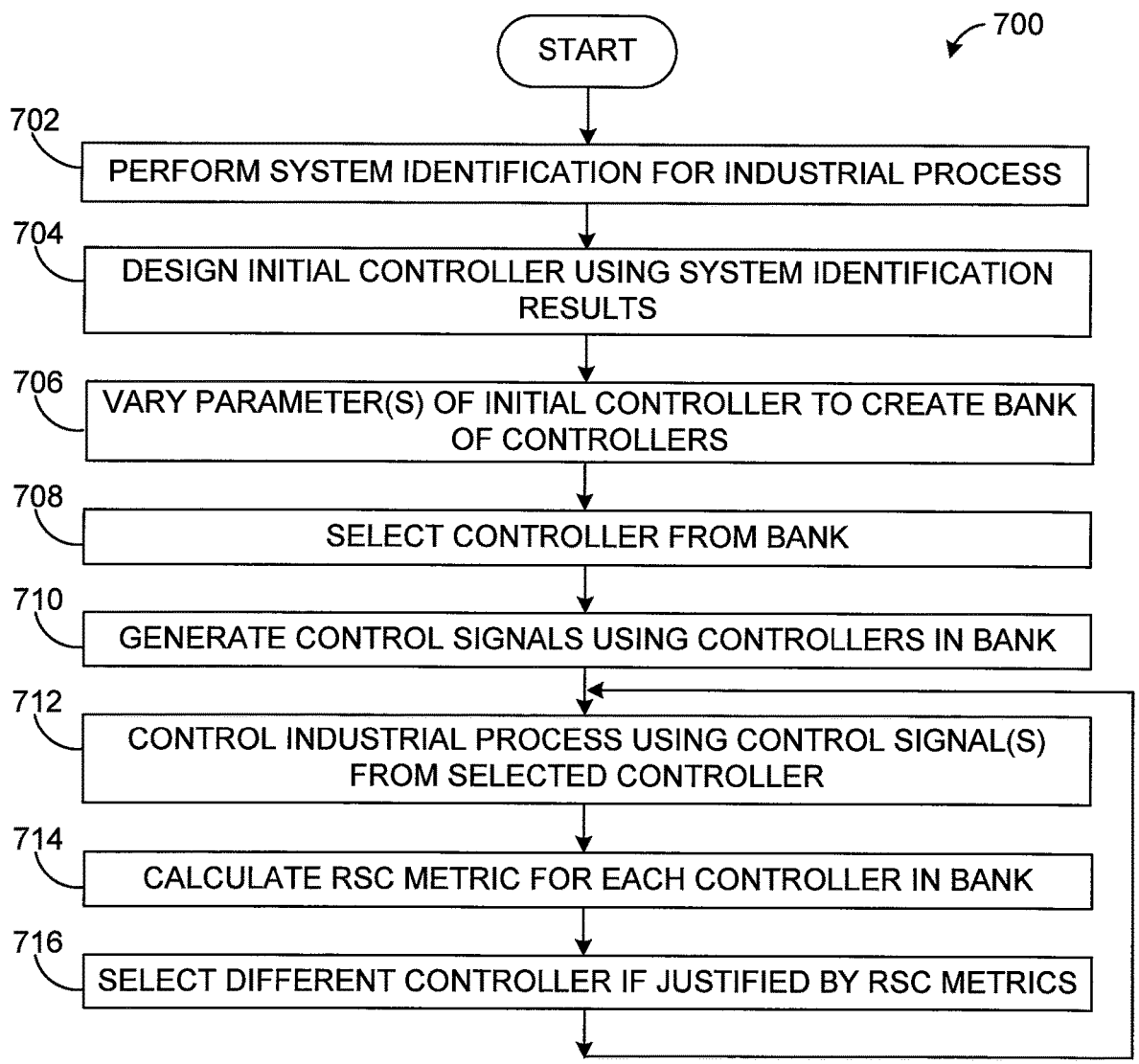
FIG. 7 illustrates a second example method supporting adaptive control of an industrial process according to this disclosure.

FIG. 7 illustrates a second example method 700 supporting adaptive control of an industrial process according to this disclosure. In particular, FIG. 7 illustrates an example method 700 for multi-model switching control of an industrial process (such as a pH neutralization process or other pH control process). For ease of explanation, the method 700 is described as being used with the control loop 600 of FIG. 6 in the system 100 of FIG. 1 or the system 200 of FIG. 2. However, the method 700 could be used with any suitable control loop, controller, and system.

As shown in FIG. 7, system identification is performed for an industrial process at step 702. This could include, for example, collecting input and output data associated with the industrial process 602 and identifying a process model representing the industrial process 602 using the data. The techniques described above with respect to FIG. 5 could be used here to support the system identification.

An initial controller is designed to control the industrial process at step 704. This could include, for example, executing a design tool to identify the $K_p$, $K_i$, and $K_d$ gains for a PID control loop or to identify different parameters for an MPC control loop. Again, the techniques described above with respect to FIG. 5 could be used here to support the controller design. Various tools and approaches are also known for designing an MPC controller or other model-based controller.

One or more parameters of the initial controller are varied to create a bank of controllers at step 706. This could include, for example, creating a set of controllers 604a-604n by varying the controller gain(s) or other parameter(s) of the initial controller. The controllers 604a-604n in the set have different gains or other parameter values that could be selected in any suitable manner (such as variations in fixed or variable steps).

A controller is selected from the bank of controllers at step 708. This could include, for example, selecting the initial controller that was originally designed in step 704. Of course, another controller could also be selected. Control signals are generated using the controllers in the bank at step 710, and the control signal or signals from the selected controller are used to control the industrial process at step 712. This could include, for example, generating one or more control signals using each of the controllers 604a-604n in the bank. This could also include the control selector 606 outputting the control signal(s) from the selected controller to the industrial process 602.

A robust stability control metric is calculated for each controller in the bank at step 714, and the RSC metrics are used to select a different controller if justified at step 716. This could include, for example, the controller 106 or 220 calculating any suitable RSC metric. This could also include the controller 106 or 220 determining whether an unselected controller 604a-604n in the controller bank has a better RSC metric than the selected controller. This could further include the controller 106 or 220 selecting the controller 604a-604n having the best RSC metric for future use in controlling the industrial process 602. The method 700 can then return to step 712 in order to continue controlling the industrial process using the newly-selected controller or the previously-selected controller (depending on the determination in step 716).

Note that a hysteresis value could be used in step 716 as part of the determination whether to select a new controller. The hysteresis value could, for example, require that the RSC metric for an unselected controller needs to exceed a specified amount before a controller switch occurs. Among other things, this could help to ensure that an excessive amount of controller switching does not occur.

Although FIG. 7 illustrates a second example of a method 700 supporting adaptive control of an industrial process, various changes may be made to FIG. 7. For example, while shown as a series of steps, various steps in FIG. 7 could overlap, occur in parallel, occur in a different order, or occur any number of times.

Example of Multi-Model Switching Control for pH Control Process

The following presents a specific example of how the above-described multi-model switching control technique could be used. The following example describes the formulation of multi-model switching control using an RSC metric for the frequency loop-shaping technique of Equation (B.6) described below.

Assume $[G_j]$ is a bank of plants and $[C_j]$ is a bank of controllers corresponding to the plants $[G_j]$, where $j=1 \ldots n$. The plants need not represent different physical plants and can instead represent different states of the same plant. The controllers can be designed, for example, using an FLS algorithm with the same target L. An RSC estimate using input-output data for each controller j could be calculated as:

$$RSC_j \leq \max_i \frac{\|SC_j F_i y - TF_i u\|_{2,\delta} - \|d\|}{\|F_i u\|_{2,\delta}} \quad (15)$$

An objective of multi-model adaptive switching control can be to switch to the controller that results in a minimum estimate of the RSC metric. The selection of the controller can thus be formulated as:

$$C_{selected} = \arg\min_{C_j} \max_i \frac{\|SC_j F_i y - TF_i u\|_{2,\delta} - \|d\|}{\|F_i u\|_{2,\delta}} \quad (16)$$

For some pH control processes, the controller structure can be restricted to a PI controller, and the adaptation can be restricted to the controller gain as described above. The bank of controllers 604a-604n could therefore be formed by varying the gain of a nominal PI controller designed for a nominal plant model. The transfer function of a controller in the bank could be expressed as:

$$C_j(s) = K_i \tilde{C} \quad (17)$$

where $\tilde{C}=(s+a)/s$, $a=K_i/K_p$, and $K_p$ and $K_i$ are the proportional and integral gains of the PI controller designed for the nominal plant. To minimize the number of controller switches, a hysteresis parameter h can be introduced. In some embodiments, the hysteresis parameter could have a value between 0.2 and 1.0.

The multi-model switching control algorithm could occur as follows. API controller $C_0$ can be designed for a nominal plant $G_0$. A bank of controllers can be formed by varying the gain $K_j$ or other parameter(s) of the nominal controller $C_0$ by different amounts. An initial controller $C_{selected}$ can be chosen, such as by selecting the original controller $C_0$. For each time step k, an RSC metric can be computed for each controller in the bank. The RSC metric $RSC_j$ for controller j could be calculated as:

$$RSC_j = \max_i \frac{\|SC_j F_i y - TF_i u\|_{2,\delta} - \|d\|}{\|F_i u\|_{2,\delta}} \quad (18)$$

A decision can be made to switch controllers if the RSC metric $RSC_{selected}$ for the selected controller satisfies the following condition:

$$RSC_{selected} > (1+h)\min_j RSC_j(k) \quad (19)$$

If that condition is satisfied, the controller $C_j^*$ can be selected, where $j^*=\arg\min_j RSC_j(k)$. Otherwise, the currently-selected controller can remain in use.

The multi-model switching control algorithm described above can use an RSC value estimated from plant input-output data, which in turn could be identified through calculation of the data's exponentially-weighted two-norm. Computation of an exponentially-weighted two-norm is described below. The choice of the exponential weight (δ) is important in the computation of the exponentially-weighted two-norm. Smaller δ values can result in more accurate RSC values but higher transient times, while higher δ values can result in lower transient times but less accurate RSC values.

The RSC computation can also handle a lack of excitation in given circumstances. For example, the disturbance threshold term described in Tsakalis et al., "Multivariable Controller Performance Monitoring Using Robust Stability Conditions," Journal of Process Control 17 (9) (2007), pp. 702-714 (which is hereby incorporated by reference) could be used in the RSC computation to avoid large bias in the RSC values because of the lack of excitation. To avoid bias in the parameter estimate because of disturbances and noise, the plant input-output data used in the adaptation algorithm can be filtered, such as by using a band pass filter that only allows signals at frequencies of interest. The target loop used in the design of the nominal controller can be used in computing the RSC for this algorithm.

Simulation results confirm that this approach can function adequately to provide effective control over a pH process or other industrial process. For example, the simulation results can show that, after a setpoint transition, the gain of a controller adapts to a steady-state value that gives performance close to a target. Note that a mismatch between a target and an actual control loop could exist as a result of quantization of the controller parameter values in the bank. The quantization error can be reduced or minimized by increasing the number of controller parameter values used in the bank. However, an increase in the number of controller parameter values can also result in an increase in the computational power required to implement an adaptive loop. Setpoint changes could also result in controller saturation in one or more instances, which again could be avoided by increasing the number and range of controller parameter values in the bank.

In conclusion, the MMSC adaptive control approach avoids problems associated with conventional approaches, such as bursting and drifting. Only one parameter (such as controller gain) may be varied in the controllers, or multiple parameters can be varied in the controllers. These multiple controllers can provide a range of operation, which could be important in many practical applications. The switching design approach can eliminate various structural limitations placed on conventional systems, and the use of an RSC metric allows this approach to take the dynamics and uncertainties of the various controllers into consideration.

Industrial Implementation Notes

As noted above, when a controller's setpoint changes in a large step, it is possible that a large overshoot could occur in the controller's output. Ramp signals may therefore be better suited for the transition between setpoints as they can result in reduced or minimal overshoot. Controller parameter adaptation also uses some excitation so that a parameter converges to a desired value. A ramp signal coupled with some pulses (such as at the end of the ramp signal) may allow a closed-loop system to transition between two operating points smoothly while providing excitation for controller parameter adaptation. The magnitude of the pulses can be chosen so that the pulses are higher than noise levels and small enough to operate the system at the provided setpoint.

Example Irreversible Reactions and Reaction Invariants of a pH Process

This section provides a summary of irreversible reactions and reaction invariants for an example pH neutralization process. The details of this pH process are examples only, and other pH control processes could be used.

The reversible reactions in the example pH neutralization process can include the following.

$$H_2CO_3 \leftrightarrow H^+ + HCO_3^- \quad (A.1)$$

$$HCO_3^- \leftrightarrow H^+ + CO_3^{2-} \quad (A.2)$$

$$H_3PO_4 \leftrightarrow H^+ + H_2PO_4^- \quad (A.3)$$

$$H_2PO_4^- \leftrightarrow H^+ + HPO_4^{2-} \quad (A.4)$$

$$HPO_4^{2-} \leftrightarrow H^+ + PO_4^{3-} \quad (A.5)$$

$$H_2O \leftrightarrow H^+ + OH^- \quad (A.6)$$

Reaction constants of these reactions can include the following.

$$K_{a1} = \frac{[HCO_3^-][H^+]}{[H_2CO_3]} \quad (A.7)$$

$$K_{a2} = \frac{[CO_3^{2-}][H^+]}{[HCO_3^-]} \quad (A.8)$$

$$K_{a3} = \frac{[H_2PO_4^-][H^+]}{[H_3PO_4]} \quad (A.9)$$

$$K_{a4} = \frac{[HPO_4^{2-}][H^+]}{[H_2PO_4^-]} \quad (A.10)$$

$$K_{a5} = \frac{[PO_4^{3-}][H^+]}{[HPO_4^{2-}]} \quad (A.11)$$

$$K_{a6} = [H^+][OH^-] \quad (A.12)$$

The pH of the solution is the negative logarithm of the hydrogen ion concentration, which can be expressed as follows.

$$pH = -\log_{10}([H^+]) \quad (A.13)$$

Chemical equilibrium can be modeled based on the concept of reaction invariants. Three reaction invariants ($W_a$ refers to a charge-related quantity, $W_b$ refers to a concentration of carbonate ions, and $W_c$ refers to a centration of phosphate ions) can be involved for each stream in this system. The reaction invariants can be expressed as follows.

$$W_{ai} = [H^+]_i - [OH^-]_i - [HCO_3^-] - 2[CO_3^{2-}] - 2[HPO_4^{2-}] - 3[PO_4^{3-}] \quad (A.14)$$

$$W_{bi} = [H_2CO_3] + [HCO_3^-] + [CO_3^{2-}] \quad (A.15)$$

$$W_{ci} = [H_3PO_4] + [H_2PO_4^-] + [HPO_4^{2-}] + [PO_4^{3-}] \quad (A.16)$$

The relationship between hydrogen ion concentration and reaction invariants can therefore be given as follows.

$$W_{ci} \frac{\frac{K_{a3}}{[H^+]} + \frac{2K_{a3}K_{a4}}{[H^+]^2} + \frac{3K_{a3}K_{a4}K_{a5}}{[H^+]^3}}{1 + \frac{K_{a3}}{[H^+]} + \frac{K_{a3}K_{a4}}{[H^+]^2} + \frac{K_{a3}K_{a4}K_{a5}}{[H^+]^3}} + \quad (A.17)$$

$$W_{bi} \frac{\frac{K_{a1}}{[H^+]} + \frac{2K_{a1}K_{a2}}{[H^+]^2}}{1 + \frac{K_{a1}}{[H^+]} + \frac{K_{a1}K_{a2}}{[H^+]^2}} + W_{ai} + \frac{K_w}{[H^+]} - [H^+] = 0$$

Example Online FLS PID Tuning Using RSC Metric

PID tuning is a well-researched topic, and one known method of PID tuning is frequency-loop shaping. In FLS, closed-loop design specifications are defined in terms of a target open-loop transfer function, and PID parameters can be selected by minimizing the distance between a target loop and an actual open-loop transfer function. A weighted $H_\infty$ norm that corresponds to the RSC metric provides a good measure of distance between the actual and target loops. Offline FLS algorithms for PID tuning can be formulated as an RSC minimization problem, and the quality of a controller design can be assessed by looking at the RSC value. If the RSC value is less than one, stability of the closed-loop system can be guaranteed. Also, lower RSC values correlate with closer actual performance to a target. The offline tuning approach can be extended to online tuning and used in adaptive control.

Let G represent a plant or process to be controlled. One objective of the FLS algorithm can be to find a controller C that minimizes the distance between an open-loop transfer function GC and a target loop L. One way of representing distance between GC and L involves using the RSC metric and the derivation of the RSC metric with the use of the small gain theorem as shown below.

Figure 8A:
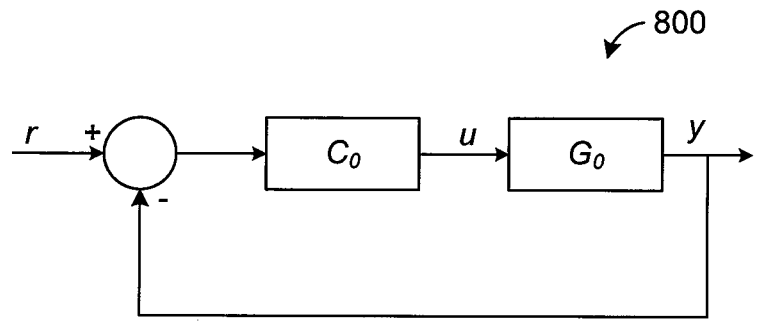
FIGS. 8A through 8C illustrate example representations of a closed-loop system used to demonstrate application of a robust stability condition metric for adaptive control of an industrial process according to this disclosure.
Figure 8B:
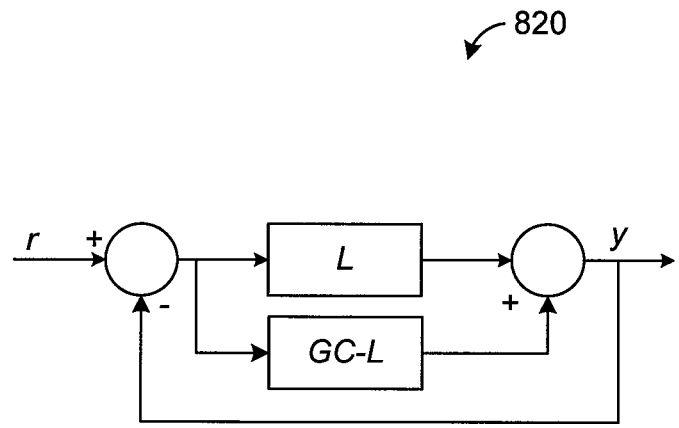
Figure 8C:
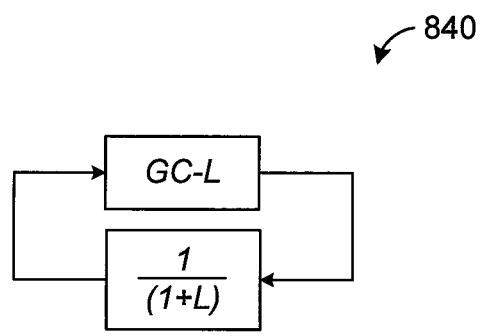

FIGS. 8A through 8C illustrate example representations of a closed-loop system used to demonstrate application of a robust stability condition metric for adaptive control of an industrial process according to this disclosure. Consider a diagram 800 of a closed-loop system as shown in FIG. 8A. The system can be rearranged into a diagram 820 as shown in FIG. 8B. If the transfer function (GC−L) is stable, it can be viewed as having stable uncertainty, and the small gain theorem can be used to derive an RSC metric. Reduction of the diagram 820 in FIG. 8B into a diagram 840 convenient for application of the small gain theorem is shown in FIG. 8C. The small gain theorem condition for the diagram 840 in FIG. 8C can be expressed as follows.

$$\left\| z(GC - L)\frac{1}{1+L} \right\|_\infty < 1 \quad (B.1)$$

The left side of Equation (B.1) is the RSC metric. By rearranging this equation, the RSC metric can be rewritten as follows.

$$RSC = \|S(CG - L)\|_\infty \quad (B.2)$$

where $S = 1/(1+L)$ is the target sensitivity. An RSC metric that is less than one can guarantee closed-loop stability and can have a high correlation to closed-loop performance. Formulation of an FLS algorithm for a controller with a PID structure as an RSC minimization is shown below.

Consider the PID parameterization of a controller, where the transfer function of the controller is shown below.

$$C(s) = K_p + \frac{K_i}{s} + \frac{K_d}{(\tau s + 1)} \quad \text{(B.3)}$$

Here, $K_p$, $K_i$, and $K_d$ are the proportional, integral, and derivative gains, respectively, and $\tau$ is a time constant of a filter of the derivative function block. For this PID parameterization, the RSC minimization problem is convex and can be solved, such as by using a standard convex optimization solver. An expression of FLS as an RSC minimization for PID tuning can be expressed as follows:

$$\theta^* = \underset{\theta \in M}{\operatorname{argmin}} \|S(GC(\theta) - L)\|_\infty \quad \text{(B.4)}$$

where $\theta$ represents the PID parameters ($K_p$, $K_i$, and $K_d$).

In cases where PID parameters are adaptively tuned online with the help of an RSC estimate, the RSC values shown in Equation (B.4) can be estimated using input-output data. Let (u,y) denote an input-output pair of a plant, and consider an error signal e=S(CG−L)u. Because y=Gu, the error signal e can be rewritten as e=SCy−Tu. The RSC metric could then be expressed in terms of input-output data as follows:

$$RSC = \|S(GC - L)\|_\infty = \sup_{\|u\| \neq 0} \frac{\|e\|_2 - \|d\|}{\|u\|_2} \quad \text{(B.5)}$$

where $\|d\|$ is a norm bound on the disturbance.

Estimation of RSC in Equation (B.5) could involve decomposition of signals e and u into frequency components. A Fast Fourier Transform (FFT) is one of the methods to decompose a signal into its frequency components. However, it results in circular convolution problems for signals with finite intervals. Another way of approximate decomposition of signals into frequency components involves using a filter bank of band-pass filters $F_i$. When a signal is passed through the filter bank, the energy of the filtered signal is computed using an exponentially-weighted average. The relation between RSC in Equation (B.5) and its estimate can be expressed as:

$$RSC \approx \max_i \frac{\|SCF_i y - TF_i u\|_2 - \|d\|}{\|F_i u\|_2} \quad \text{(B.6)}$$
$$\leq \max_i \frac{\|SCF_i y - TF_i u\|_{2,\delta} - \|d\|}{\|F_i u\|_{2,\delta}}$$

where $\|.\|_2$ and $\|.\|_{2,\delta}$ are the two-norm and exponentially-weighted two-norm, respectively. There are different ways of computing an exponentially-weighted two-norm, such as by using the method described below. This RSC estimate can provide one example basis for the proposed adaptive control algorithms discussed above.

Example Exponentially-Weighted Two-Norm Computation

Consider a signal v(t). The exponentially-weighted two-norm of the signal can be defined as follows.

$$\|v\|_{2,\delta} = \left( \int_{-\infty}^{\infty} e^{-\delta t} v^2(t) dt \right)^{\frac{1}{2}} \quad \text{(C.1)}$$

To compute the exponentially-weighted two-norm for data, it is assumed that the signal is from a casual system v(t)=0, ∀t<0. Thus, the lower limit of the integral in Equation (C.1) can be changed to 0, and the upper limit of the integral in Equation (C.1) can be changed to the current time T of the signal v(t). Equation (C.1) can therefore be modified as follows.

$$\|v\|_{2,\delta} = \left( \int_0^T e^{-\delta t} v^2(t) dt \right)^{\frac{1}{2}} \quad \text{(C.2)}$$

To compute the norm in Equation (C.2), a signal $v^2(t)$ can be filtered through a filter with a transfer function of $1/(s+\delta)$, with zero as an initial condition of the state. The square root of the output of the filter can give the value of the exponentially-weighted two-norm value as described in Equation (C.2).

CONCLUSION

In conclusion, this patent document has provided different formulations of adaptive control, including direct adaptive control and multi-model switching control. Both approaches could use FLS or other tuning, along with an RSC cost function obtained from online input-output data. These algorithms can be used to support controller gain adaptation or other parameter adaptation in order to obtain substantially uniform performance over a wide operating range.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
controlling an industrial process using a process controller;
determining a robust stability condition (RSC) value during operation of the process controller, the RSC value providing an estimate of performance of the process controller in controlling the industrial process, wherein the RSC value is based on data from the industrial process, a transfer function associated with the process controller, and an exponentially weighted average;
decomposing the data, using a filter, to generate a frequency component;
filtering the frequency component through the filter with the transfer function to determine the exponentially weighted average; and
adaptively modifying a characteristic of the process controller based on the RSC value.

2. The method of claim 1, wherein only a single characteristic of the process controller is adaptively modified.

3. The method of claim 2, wherein:
the process controller is configured to control a pH of material in the industrial process;
the characteristic of the process controller comprises a gain of the process controller; and
adaptively modifying the characteristic of the process controller comprises altering the gain in response to a setpoint change in the industrial process.

4. The method of claim 1, wherein the RSC value is further based on at least one of a target sensitivity of the process controller, a transfer function associated with the process controller, a transfer function associated with the industrial process, or a target transfer function.

5. The method of claim 1, wherein adaptively modifying the characteristic of the process controller comprises adaptively modifying the characteristic of the process controller during frequency loop-shaping (FLS) tuning of the process controller.

6. The method of claim 1, wherein the process controller comprises a proportional-integral (PI) or proportional-integral-derivative (PID) controller.

7. An apparatus comprising:
at least one processing device configured to:
determine a robust stability condition (RSC) value during operation of a process controller, the process controller configured to control an industrial process, the RSC value providing an estimate of performance of the process controller in controlling the industrial process, wherein the RSC value is based on data from the industrial process, a transfer function associated with the process controller, and an exponentially weighted average;
decompose the data, using a filter, to generate a frequency component;
filter the frequency component through the filter with the transfer function to determine the exponentially weighted average; and
adaptively modify a characteristic of the process controller based on the RSC value.

8. The apparatus of claim 7, wherein the at least one processing device is configured to adaptively modify only a single characteristic of the process controller.

9. The apparatus of claim 8, wherein:
the process controller is configured to control a pH of material in the industrial process;
the characteristic of the process controller comprises a gain of the process controller; and
the at least one processing device is configured to alter the gain in response to a setpoint change in the industrial process.

10. The apparatus of claim 7, wherein the RSC value is further based on at least one of a target sensitivity of the process controller, a transfer function associated with the process controller, a transfer function associated with the industrial process, or a target transfer function.

11. The apparatus of claim 7, wherein the at least one processing device is configured to adaptively modify the characteristic of the process controller during frequency loop-shaping (FLS) tuning of the process controller.

12. The apparatus of claim 7, wherein the at least one processing device forms part of the process controller.

13. A method comprising:
receiving input data associated with an industrial process at multiple process controllers;
selecting one of the process controllers based on robust stability condition (RSC) values associated with the process controllers, the RSC values providing estimates of performances of the process controllers in controlling the industrial process, wherein the RSC value is based on the input data, a transfer function associated with one of the process controllers, and an exponentially weighted average;
decomposing the input data, using a filter, to generate a frequency component;
filtering the frequency component through the filter with the transfer function to determine the exponentially weighted average; and
outputting one or more control signals from the selected process controller to the industrial process in order to control the industrial process.

14. The method of claim 13, wherein the process controllers have at least one common parameter that varies in the process controllers so that the process controllers generate different control signals.

15. The method of claim 14, wherein:
the process controllers are configured to control a pH of material in the industrial process;
the at least one common parameter of the process controllers comprises a gain of the process controllers; and
different ones of the process controllers have different gains.

16. The method of claim 13, wherein selecting one of the process controllers based on the RSC values comprises:
determining that the RSC value for a currently-selected process controller exceeds a threshold value; and
in response to the determination, selecting a process controller having a minimum RSC value.

17. The method of claim 16, wherein the threshold value comprises a value of one plus a hysteresis value.

18. The method of claim 13, wherein the RSC value for each process controller is further based on at least one of a target sensitivity of that process controller, a transfer function associated with that process controller, a transfer function associated with the industrial process, or a target transfer function.

19. An apparatus comprising:
multiple process controllers configured to receive input data associated with an industrial process, each process controller also configured to generate one or more control signals for controlling the industrial process; and
a controller configured to select one of the process controllers based on robust stability condition (RSC) values associated with the process controllers, the RSC values providing estimates of performances of the process controllers in controlling the industrial process, wherein the RSC values are based on the input data, transfer functions associated with the process controllers, and exponentially weighted averages;
decompose the input data, using filters, to generate frequency components;
filter the frequency components through the filters with the transfer functions to determine the exponentially weighted averages; and
the controller configured to output the one or more control signals from the selected process controller to the industrial process.

20. The apparatus of claim 19, wherein the process controllers have at least one common parameter that varies in the process controllers so that the process controllers generate different control signals.

21. The apparatus of claim 20, wherein:
the process controllers are configured to control a pH material in the industrial process;
the at least one common parameter of the process controllers comprises a gain of the process controllers; and
different ones of the process controllers have different gains.

22. The apparatus of claim 19, wherein the controller is configured to:
determine that the RSC value for a currently-selected process controller exceeds a threshold value; and
in response to the determination, select the process controller having a minimum RSC value.

23. The apparatus of claim 19, wherein the RSC value for each process controller is further based on at least one of a target sensitivity of that process controller, a transfer function associated with that process controller, a transfer function associated with the industrial process, or a target transfer function.

* * * * *